3,454,688
Patented July 8, 1969

3,454,688
PROCESS FOR THE PRODUCTION OF FORMED GYPSUM CASTINGS
Edward Graham Foster and Martin S. Bloom, Norton-on-Tees, England, assignors to Imperial Chemical Industries Limited, London, England, a corporation of Great Britain
Filed June 3, 1966, Ser. No. 555,095
Claims priority, application Great Britain, June 15, 1965, 25,246/65
Int. Cl. B28b 5/02
U.S. Cl. 264—42    12 Claims

ABSTRACT OF THE DISCLOSURE

This invention provides a method of forming lightweight gypsum building blocks or panels which require little or no drying and which set so quickly that it is possible to cast them in a continuous mold. The invention provides a continuous process for casting gypsum building blocks or panels directly from product gypsum.

---

Figure 1:
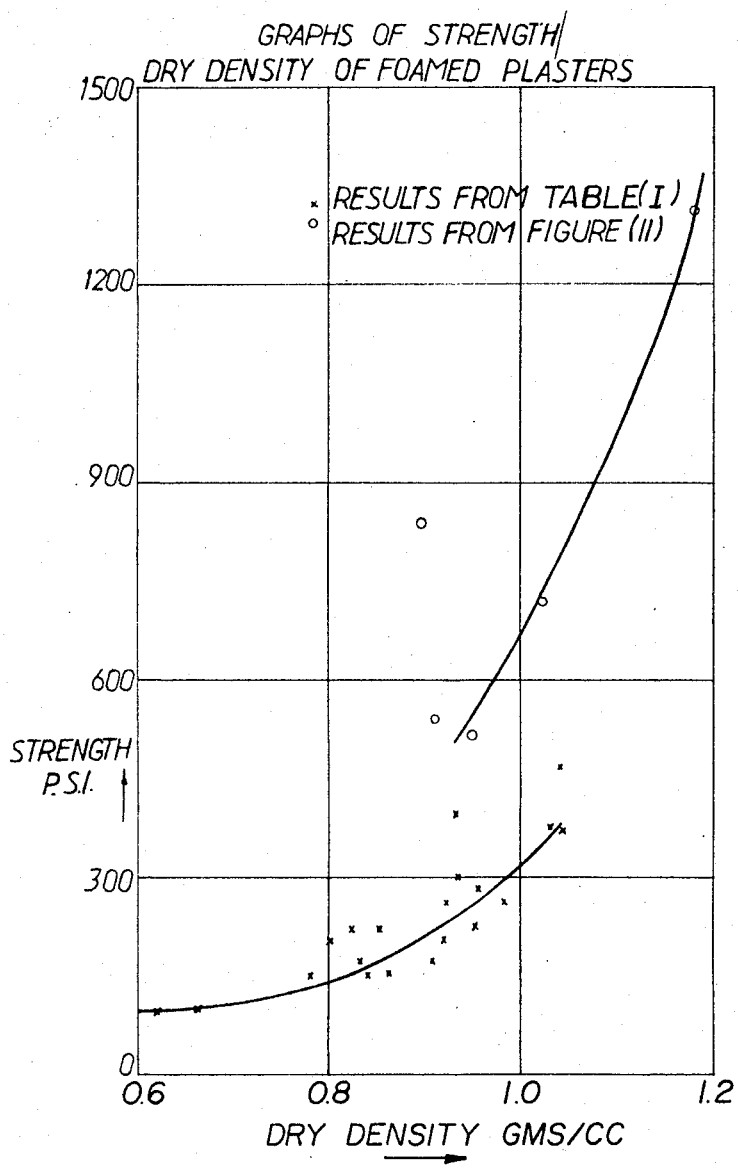

The present invention relates to the production of gypsum castings from calcium sulphate hemihydrate.

When water is added to hemihydrate to form a slurry suitable for casting, some of it is used up in the rehydration which accompanies setting, but the rest has to be removed by a drying process, usually a thermal drying process, which is expensive in both fixed and running costs. For example, a lightweight gypsum casting may be made from a dilute hemihydrate slurry mixed at a water ratio of 1.0 (ratio of weight of water to weight of solid hemihydrate); for the rehydration stage:

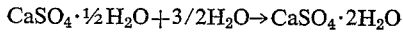

$$CaSO_4 \cdot \tfrac{1}{2}H_2O + 3/2 H_2O \rightarrow CaSO_4 \cdot 2H_2O$$

18.5 g. of water are required per 100 g. of hemihydrate. Thus for every 100 g. of hemihydrate mixed with 100 g. of water, 81.5 g. of excess water have to be removed in order to attain total dryness after rehydration. The removal of so much water creates voids in the cast end product, the final dry density of which is only about 0.87 g./cc. A just-pourable or just-pumpable hemihydrate slurry can be formed using a quantity of water just slightly in excess of the water ratio required for plastering consistency, and this is the minimum quantity of water (or "minimum water ratio") required to form a hemihydrate slurry which can be used for casting either in a batch mould or continuously. In the case of beta-hemihydrate, this minimum water ratio is about 0.6, so that for every 100 g. of beta-hemihydrate mixed with 60 g. of water, 18.5 g. of water are used up in rehydration and 41.5 g. of excess water have to be removed in order to attain total dryness after rehydration. Thus it will be seen that the use of the minimum water ratio approximately halves the quantity of excess water to be removed by drying. However it also means that during drying fewer voids are created in the cast end product which accordingly has a greater density, viz., approximately 1.23 g./cc.

An α-hemihydrate with a bulk density of 1.6 g./cc., when formed into a slurry at about the minimum water ratio, contains only 25.4 g. of water per 100 grams hemihydrate, and in the case of an α-hemihydrate having a bulk density of 1.8 g./cc., no water remains to be dried out since the minimum water ratio is 0.185, which is also the amount of water required for the rehydration stage, i.e., no water requires to be dried out of the cast end product; however, the final dry density of the cast end product is 2.14 g./cc. Thus, although the use of the minimum water ratio is advantageous in eliminating the necessity for drying, it has the disadvantage of producing castings of excessive weight for building purposes and of excessive hardness for practicable workability with cutting tools.

The object of this invention is to obtain the economic benefits deriving from the reduced drying requirements of casting with low water ratio hemihydrate slurries, while at the same time securing the benefits of the physical characteristics of lightweight gypsum castings and this object is achieved by arranging for voids to be created in the cast end products so as to reduce their density and hardness to levels acceptable for building materials. Such voids could, for example be created by incorporating in the hemihydrate slurry a preformed organic froth produced by agents such as "Ultrawet" (registered trademark) and "Afrosol" (registered trademark). In a series of experiments with unmilled α-hemihydrate, however, it was found that such preformed froths did not give a good product and had two adverse effects:

(1) Retardation of the set, which allowed time for the froth to collapse.

(2) Addition of the frothed agent made the slurry less viscous, i.e., there was an apparent decrease in the water ratio.

It was also found that mixing of the froth and slurry was difficult and messy. To achieve a uniform cell distribution, a great deal of careful stirring was required; over-vigorous stirring collapsed the froth. The cell size varied because of this poor mixing, and holes appeared in the product where bubbles of froth had stayed agglomerated instead of being separate.

We have now found, however, that these difficulties and adverse effects can be avoided by causing the slurry to foam by generating carbon dioxide in situ therein by the action of sulphuric acid on calcium carbonate. By appropriate selection of the quantities of carbonate and acid, it is possible to obtain a final product of any desired density. Furthermore, sulphuric acid has the effect of accelerating setting, so it is used in sufficient excess to ensure that setting occurs at any desired moment, for example when foaming is at or near its maximum. The use of sulphuric acid and calcium carbonate has the additional advantage that it produces, besides carbon dioxide, gypsum so that the reaction leaves behind no foreign ions which could lead to efflorescence.

The present invention accordingly provides a process for producing quick-setting lightweight foamed gypsum castings requiring little or no drying, which comprises the steps of mixing calcium sulphate hemihydrate with water to form a pourable or pumpable slurry, preferably of approximately plastering consistency, introducing into said slurry, or into the slurrying water, calcium carbonate and sulphuric acid in quantities sufficient to generate sufficient foam-forming carbon dioxide gas in situ within said slurry to reduce the density of the final product to within desired limits, the sulphuric acid being added in sufficient excess to accelerate setting of the slurry to within desired limits, and casting the foaming slurry, either continuously or batch-wise, in a mould or the like.

We have found that if the acid is added to the slurrying water, setting may occur before the slurrying is complete, and it is therefore desirably added to the completed slurry immediately before casting. Also, to avoid adding excess water to the slurry, which is already of plastering consistency, the acid is preferably added in concentrated form.

While the invention is applicable to all alpha- and beta-hemihydrates, the alpha-hemihydrate produced by our continuous autoclave process, as described and claimed in our copending British patent application No. 47,675/63, is particularly suitable. The normal crystal habit of alpha-hemihydrate is acicular, with an aspect ratio of about 10:1, but we have found that crystals of prismatic form, with an aspect ratio of 2:1 or even less, can readily be produced by our said continuous autoclave process. In partial consequence of its crystal habit, the alpha-hemihydrate from our continuous autoclave process therefore requires very little water to form a just-pourable slurry.

In our copending British patent application No. 7,576/64, we have described and claimed a method of handling an alpha-hemihydrate slurry produced by our continuous autoclave process, which comprises the steps of maintaining the slurry at a temperature above 60° C. raising its pH to a value at which, at said temperature, hydration is substantially retarded, and maintaining the slurry in the liquid state at or above the said temperature and at or above the said pH value until it is required for use.

It will thus be seen that a completely continuous process for producing gypsum castings which require little or or no drying is provided as follows:

(1) Alpha-hemihydrate slurry is produced continuously from gypsum, for example by-product gypsum, by the continuous autoclave process of our copending British patent application No. 47,675/63;

(2) The alpha-hemihydrate slurry is maintained in the liquid state by the method described and claimed in our copending British patent application No. 7,576/64;

(3) After centrifuging to remove excess water, if necessary, foamed gypsum castings are cast batchwise or continuously by the method described and claimed in the present application.

In a first series of experiments, alpha-hemihydrate was mixed with water to form a slurry of plastering consistency, with and without other additives, various quantities of calcium carbonate and sulphuric acid of different concentrations were added under stirring, and the resulting foamed slurries were cast into one-inch cubes, dried, weighed and crushed in a compression machine. The results are shown in following table an illustrate the importance of maintaining an optimum relationship between the quantity and rate of evolution of blowing gas and the rate of setting.

retarder into the water first, and thereafter to add the hemihydrate in a dispersed form so that no lumps form in the slurry.

From the slurry vessel 1, the slurry is pumped continuously by means of a variable speed pump 2 to a mixer box 3 into which a metering pump 4 pumps continuously sulphuric acid (e.g., about 1% by weight) of the desired concentration; in practice the concentration and rate of addition of the acid are selected so as to give as fast a set as possible. The mixer box 3 provides rapid mixing of the acid with the slurry, and dispenses the rapidly setting foaming slurry through one or more injection nozzles 5 into a continuous slab casting machine generally designated 6.

The machine 6 is open at the top and at its two ends to form an open-ended continuous mould comprising a pair of upright continuous side tracks 7 and a continuous base belt 8, all of which are driven at the same speed through a variable speed gear box 9. The foaming slurry is injected into one end of the open mould, preferably at several (for example, three) different levels above the base belt 8 simultaneously, and is allowed to rise to any height. Setting is extremely rapid and the speed of the side tracks 7 and belt 8 is so selected that setting is complete by the time the casting emerges as a continuous slab from the other end of the mould where it is carried forward on rollers under suitable machinery for cutting, shaping etc.

It will be appreciated that the quantity of slurry injected into the mould per unit time will depend upon the speed at which the tracks 7 and the belts 8 are moving, which will in turn depend upon the speed of setting. The total throughput is therefore dependent upon the setting time and the length of the mould.

The continuous side tracks 7 consist of a plurality of metal strips 10 fastened together as in caterpillar tracks, and in accordance with our invention each side track 7 is surrounded by an external continuous belt (not illustrated) made of, or coated with, a suitable release ma-

TABLE

| Wt. of alpha hemihydrate (g.) | Wt. of $CaCO_3$ (g.) | Vol. of water (cc.) | Vol. of 5% cafferata (cc.) | Vol. of additive | Vol. of 30% $H_2SO_4$ (ml.) | Average cake strength (p.s.i.) | Dry density (gm./cc.) | Comments |
|---|---|---|---|---|---|---|---|---|
| 100 | 0.28 | 35 | 5 | 1 ml. of Ultrawet | 2 | 1,320 | 1.18 | Insufficient foam, too dense. |
| 100 | 0.75 | 35 | 8 | | 2 | 530 | 0.906 | Better foam, low strength. |
| 100 | 0 75 | 34 | 4 | | 2 | 840 | 0.891 | Quick set, good foam, good strength. |
| 100 | 0.75 | 32 | | | 1 | 525 | 0.95 | Too slow a set, insufficient foam. |
| 100 | 1.25 | 40 | | | ¹ 2 | 720 | 1.02 | Set too quickly, probably stirred through set. |

¹ Conc.

The foaming hemihydrate slurry of the invention may be cast in batch moulds or continuously, and a wide range of castings of any desired strength and density can be obtained by varying the consistency of the slurry and/or by adjustment of the quantities of the calcium carbonate and/or the sulphuric acid and/or by adjustment of the concentration of the latter. Two typical sets of strength versus density data are plotted in FIG. 1 of the accompanying drawings; the differences in the two sets of results are probably caused by stirring the slurry through the initial set.

Figure 2:
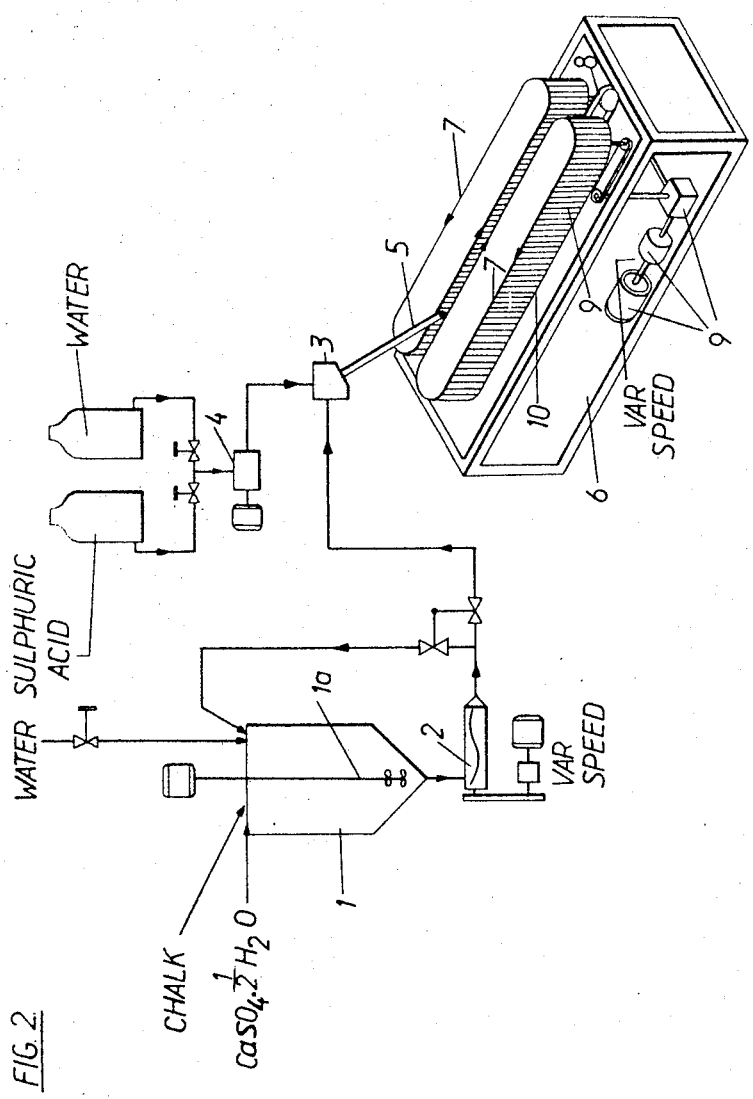

One arrangement according to the invention for the continuous production of cast foamed gypsum slabs is illustrated diagrammatically in FIG. 2 of the accompanying drawings. Hemihydrate, water, chalk (e.g., about 0.6% by weight of the hemihydrate) and, if desired, a retarder (e.g., about 0.3% Cafferata retarder) are mixed together in a slurry vessel 1 fitted with stirrer 1a, the amount of water used being just sufficient to form a pumpable slurry (i.e., being slightly in excess of the minimum required for plastering consistency). In practice, we have found it advisable to mix the chalk and terial, for example polytetrafluoroethylene such as "Fluon" (registered trademark). The external "Fluon" (registered trademark) belt constitutes the mould surface, and the metal strips 10 ensure that a flat surface is obtained. The side tracks 7 are supported so that an accurately dimensioned casting is obtained.

The base belt 8 makes a good seal with the side tracks 7, thereby preventing leakage of the foaming slurry before it sets. To ensure a flat base, the belt 8 moves over a metal plate which gives it rigidity, and in accordance with our invention is likewise formed from, or coated with, a release material such as "Fluon" (registered trademark).

As described and illustrated, we carry out casting in the vertical position since the foaming slurry tends to rise rather than spread out horizontally, but it will be appreciated that casting can easily be carried out in the horizontal position, in which case the injection nozzles 5 would inject the foaming slurry into the mould at several (e.g., three) different points along its width, or they might be replaced by a single travelling injection nozzle adapted to move to and fro across the width of the mould in reciprocating fashion. Horizontal casting is preferred for production of thin panels.

Laminated products comprising a foamed gypsum slab made in accordance with the process of our invention and covered on one or both faces with a facing material, for example plasterboard or paper, can also be made in the continuous mould 6. Thus, for example, two lengths of plasterboard can be run through the mould from the injection end, in contact with opposite surfaces of the mould, and the foaming slurry is injected therebetween. Or two continuous lengths of paper can be run through the mould from off rolls, in contact with opposite surfaces of the mould, and the foaming slurry is likewise injected therebetween.

Foamed gypsum castings and laminated products made in accordance with the process of our invention can be reinforced by running through the centre of the mould, from off reels, one or more continuous sheets of wire mesh, or a reinforcement such as that described and claimed in our copending British patent application No. 31,166/63 may be employed. Another method of reinforcement is to mix glass fibres into the hemihydrate slurry before the addition of the sulphuric acid thereto.

Laminated products made in accordance with the process of our invention can also be produced by using an apparatus and arrangement similar to that described and illustrated in our British patent specification No. 997,086.

We claim:

1. Process for producing quick-setting lightweight gypsum castings, which comprises the steps of mixing calcium sulphate hemihydrate with water to form a pourable, pumpable slurry, generating foam-forming carbon dioxide gas in situ within said slurry by the reaction of calcium carbonate and sulphuric acid in quantities sufficient to reduce the density of the final product to within desired limits, the sulphuric acid being used in sufficient excess to accelerate setting of the slurry to within desired limits, and casting the foaming slurry.

2. The process of claim 1 wherein the calcium sulfate hemihydrate is the $\alpha$-hemihydrate.

3. The process of claim 1 wherein the amount of calcium carbonate employed is up to about 1.25 weight percent.

4. The process of claim 1 wherein up to about 40 cc. of water are used per 100 grams of hemihydrate to form the slurry.

5. Process as claimed in claim 1, wherein the foaming slurry is cast batchwise in a mould.

6. Process as claimed in claim 1, wherein the foaming slurry is cast around at least one reinforcement.

7. Process as claimed in claim 1, wherein the amount of water used is not substantially in excess of the minimum water ratio required for plastering consistency.

8. Process as claimed in claim 7, wherein at least one retarder is introduced into the slurry, and the amount of sulphuric acid added is in sufficient excess to overcome the retarding action of the retarder and to accelerate setting of the slurry to within desired limits.

9. Process as claimed in claim 7, wherein the calcium carbonate is added to the water prior to mixing with the hemihydrate, and the sulphuric acid is added to the slurry after mixing with the hemihydrate is substantially complete.

10. Process as claimed in claim 7, wherein the foaming slurry is cast continuously in a mould.

11. Process as claimed in claim 10, wherein the foaming slurry is introduced continuously into one end of a substantially vertical continuous mould having a horizontal endless track for a base and a pair of vertical, spaced, parallel endless tracks for sides, the speed and length of the endless tracks being so selected that the slurry has set by the time it issues from the other end of the mould.

12. Process as claimed in claim 10, wherein the foaming slurry is introduced continuously into one end of a substantially horizontal continuous mould having a pair of horizontal, spaced, parallel endless tracks for top and base, the speed and length of the endless tracks being so selected that the slurry has set by the time it issues from the other end of the mould.

References Cited

UNITED STATES PATENTS

| 529,535   | 11/1894 | Smith _____ 25—42    |
| 1,033,251 | 7/1912  | King _____ 25—42    |
| 1,367,227 | 2/1921  | Baumgartl _____ 25—42 XR   |
| 1,573,502 | 2/1926  | Peters _____ 264—171 XR  |
| 2,200,155 | 5/1940  | Camp et al. _____ 264—41 XR   |
| 3,214,793 | 11/1965 | Vidal _____ 264—51 XR   |

FOREIGN PATENTS

| 11,443  | 9/1890  | Great Britain. |
| 280,116 | 11/1927 | Great Britain. |

OTHER REFERENCES

Welch, F. C.: "Effects of Accelerators and Retarders on Calcined Gypsum," in Journal of the American Ceramic Society, vol. 6, No. 11, November 1923, pp. 1197–1207.

PHILIP E. ANDERSON, *Primary Examiner.*

U.S. Cl. X.R.

18—4; 25—42; 106—109, 122, 315; 264—41